(12) United States Patent
Maeda et al.

(10) Patent No.: US 7,105,978 B2
(45) Date of Patent: Sep. 12, 2006

(54) ROTOR OF ELECTRIC ROTATING MACHINE

(75) Inventors: Naohide Maeda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/181,839

(22) Filed: Jul. 15, 2005

(65) Prior Publication Data

US 2005/0269897 A1 Dec. 8, 2005

Related U.S. Application Data

(62) Division of application No. 10/665,116, filed on Sep. 22, 2003, now Pat. No. 6,936,946.

(30) Foreign Application Priority Data

Dec. 12, 2002 (JP) .............................. 2002-36035

(51) Int. Cl.
  *H02K 1/22* (2006.01)
(52) U.S. Cl. .................. 310/263; 310/156.66
(58) Field of Classification Search .......... 310/156.66, 310/156.68, 156.69, 156.72, 156.73, 263, 310/51, 156.45
See application file for complete search history.

(56) References Cited

U.S. PATENT DOCUMENTS

| 5,793,144 A | 8/1998 | Kusase et al. |
| 5,903,084 A | 5/1999 | Asao et al. |
| 5,925,964 A | 7/1999 | Kusase et al. |
| 6,172,441 B1 * | 1/2001 | York et al. .................... 310/263 |
| 6,307,297 B1 * | 10/2001 | Bramson et al. ............ 310/263 |
| 6,424,581 B1 * | 7/2002 | Bosch et al. ................. 365/195 |
| 6,806,616 B1 | 10/2004 | Morikaku et al. |
| 2004/0100162 A1 * | 5/2004 | Maeda et al. ................ 310/263 |

FOREIGN PATENT DOCUMENTS

| JP | 11-136913 A | 5/1999 |
| JP | 2001-86715 A | 3/2001 |

* cited by examiner

*Primary Examiner*—Tran Nguyen
(74) *Attorney, Agent, or Firm*—Sughrue Mion, PLLC (57) ABSTRACT

Leakage of a magnetic flux from inside diameter face of claw magnetic poles is reduced to improve output, and deformation and vibration of the claw magnetic poles are reduced. A rotor includes: a rotor coil for generating magnetic flux; a pole core comprised of a first pole core body and a second pole core body that are arranged so as to cover the rotor coil, each being provided with protruding claw magnetic poles 21, 22 engaging with each other; a magnet 31 for reducing leakage of magnetic flux leaking from inside diameter side of the claw magnetic poles 21, 22; and a magnet-holding member 32 for supporting the magnet 31 on the claw magnetic poles 21, 22.

6 Claims, 8 Drawing Sheets

ROTOR OF ELECTRIC ROTATING MACHINE

This is a divisional of Application Ser. No. 10/665,116, filed Sep. 22, 2003 now U.S. Pat. No. 6,936,946.

BACKGROUND OF THE INVENTION

1. Field of the Invention

The present invention relates to a rotor structure of an electric rotating machine such as ac generator or electric motor and, more particularly, to a magnet that prevents leakage of magnetic flux from inside diameter face of claw magnetic poles and to a structure of fitting the magnet.

2. Description of the Related Art

In a conventional rotor structure, rectangular solid magnets polarized in a direction of reducing leakage of magnetic flux between sides of adjacent claw magnetic poles are fixed between the claw magnetic poles facing each other, and holders for reducing centrifugal force are used to fit these magnets.

When the magnets for preventing leakage of magnetic flux are fitted to the claw magnetic poles of a rotor core as described above, the claw magnetic poles increase in weight. Therefore, end of each claw magnetic pole reciprocates toward a rotor coil and a stator due to centrifugal force caused by rotation of the rotor and magnetic attraction between the claw magnetic pole and the stator produced at the time of power generation.

As a result, a load is applied to the magnets between the claw magnetic poles, and this sometimes may cause distortion or breakage of the magnets.

To overcome this, in a conventional rotor, a magnet is fixed to each claw magnetic pole in such a manner as to cover an inner circumferential face and a side face of the claw magnetic pole.

In this known construction, spaces are left between the adjacent magnets.

As a result, the claw magnetic poles and the magnets reciprocate independently, therefore any load is not applied to the magnets, and it is possible to prevent the magnets from breakage (for example, see the Japanese Patent Publication (unexamined) No. 1999/136913, pages 3 and 4).

In another conventional rotor, each claw magnetic pole is provided with two ferrite magnets on both side faces of each claw magnetic pole, and these magnets are polarized so as to reduce leakage of magnetic flux between the claw magnetic poles.

These magnets are supported on the claw magnetic poles, with a slant so as to spread their outer circumference sides toward each other, by magnet-holding members for absorbing centrifugal force that acts on the mentioned magnets when the rotor is rotating through deformation of the magnet-holding members themselves. Thus, the magnets are so constructed as to withstand centrifugal force (for example, see the Japanese Patent Publication (unexamined) No. 2001/86715, page 6).

Generally, in order to improve output of a rotor of an electric rotating machine, one method is to reduce an air gap between rotor and stator, and another is to prevent leakage of magnetic flux from magnetic poles.

The easiest method to prevent leakage of magnetic flux from the magnetic poles is fitting a permanent magnet to a portion where magnetic flux leaks, i.e., between the magnetic poles or on the inside diameter face of the claw magnetic poles.

To fix the permanent magnet, it is necessary to use any magnet-holding member, and in a case where the magnets are fitted between the claw magnetic poles, centrifugal force acts on the magnet itself. Therefore, it is necessary that the magnet-holding member be constructed so as to withstand centrifugal force to prevent the magnet from getting out.

In the mentioned prior art, structure of the magnet-holding member is strong enough to withstand centrifugal force by employing a special configuration.

However, a problem exists in this prior art that the magnet-holding member itself increases in weight thereby increasing weight of the claw magnetic poles as a whole, eventually resulting in deformation of the claw magnetic poles.

Another problem exists in prior art that it is essential to enlarge the air gap because of preventing the electric rotating machine from breakage occurring at the time the claw magnetic poles come in contact with the stator.

SUMMARY OF THE INVENTION

To improve output of the electric rotating machine easily, it may be an idea to fit any magnet on the inside diameter face thereby preventing leakage of magnetic flux from the inside diameter side of the claw magnetic poles.

In this method, it is certain that acceleration of rotation of the magnets generates centrifugal force, but the claw magnetic poles receive the centrifugal force. Thus, the magnet-holding members for fixing the magnet to the inside diameter face can be simpler and lighter than the holding member employed for fixing the magnet between the claw magnetic poles.

As a result, it is possible to minimize the increase in weight of the claw magnetic poles caused by fitting the magnet, and consequently, it is possible to reduce the air gap.

The magnet fitted on the inside diameter face of the claw magnetic poles is fixed in the circumferential direction by the claw magnetic poles and, at the same time, any position regulating part is provided in axial direction in order to prevent the magnet from getting out in axial direction thereby improving assembling efficiency.

An object of the present invention is to reduce deformation caused by centrifugal force as well as prevent movement in axial direction by fitting a magnet on the inside diameter side of the claw magnetic poles and designing fitting structure of the magnet.

A rotor of an electric rotating machine according to claim 1 of the invention includes: a rotor coil for generating magnetic flux by applying a current; and a pole core comprised of a first pole core body and a second pole core body that are arranged so as to cover the mentioned rotor coil, each being provided with claw-shaped claw magnetic poles engaging with each other. In this rotor, a magnet assembly composed of a magnet for reducing leakage of magnetic flux and a magnet-holding member for supporting this magnet on the claw magnetic poles are arranged on inside diameter faces of the claw magnetic poles.

As a result, it is possible to reduce leakage of magnetic flux from inside diameter face of the claw magnetic poles and improve output.

DESCRIPTION OF THE PREFERRED EMBODIMENTS

Embodiment 1.

Figure 1:
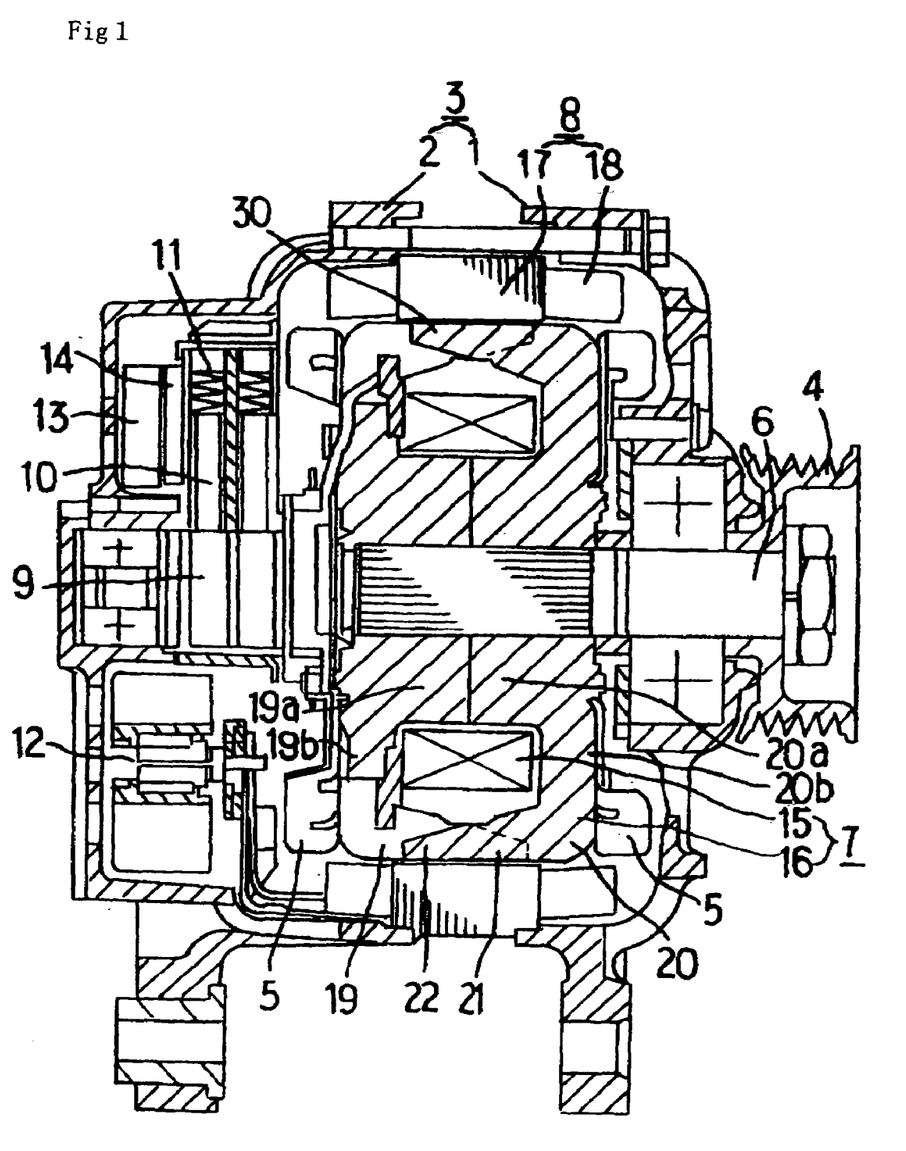
FIG. 1 is a sectional side view showing an electric rotating machine according to Embodiment 1 of the present invention.

FIG. 1 is a sectional side view showing an electric rotating machine in its entirety such as ac generator or an electric motor according to one embodiment of the present invention. Referring to the drawing, this electric rotating machine is provided with a housing 3 comprised of a front bracket 1 and a rear bracket 2 both made of aluminum, a shaft 6 disposed in this housing 3 and provided with a pulley 4 fixed onto an end thereof, a Randell-type rotor 7 fixed onto this shaft 6, fans 5 fixed onto both end faces of this rotor 7, a stator 8 fixed onto an inner wall face in the housing 3, a slip ring 9 that is fixed to the other end of the shaft 6 and supplies the rotor 7 with a current, a pair of brushes 10 sliding on this slip ring 9, a brush holder 11 in which these brushes 10 are accommodated, a rectifier 12 that is electrically connected to the stator 8 and rectifies an alternating current generated in the stator 8 into a direct current, a heat sink 13 fitted to the brush holder 11, and a regulator 14 adhering to this heat sink 13 and regulating the alternating voltage generated in the stator 8.

The rotor 7 is provided with a cylindrical rotor coil 15 for generating a magnetic flux by applying an electric current and a pole core 16 constructed so as to cover this rotor coil 15. Magnetic flux generated by the rotor coil 15 forms a magnetic pole in the pole core 16.

The stator 8 is provided with a stator core 17 and a stator coil 18 wound round this stator core 17, and in which alternating current is generated by change in magnetic flux from the rotor coil 15 with rotation of the rotor 7.

The pole core 16 is comprised of a first pole core body 19 and a second pole core body 20 engaging with each other and forming a pair.

The pole core body 19 and the pole core body 20 are normally composed of iron, each being comprised of a cylindrical part 19a, 20a round which the rotor coil 15 is wound and a disk-shaped base part 19b, 20b from which the cylindrical part 19a, 20a protrudes.

The outer edges of the base parts 19b, 20b are provided with plural claw magnetic poles 21, 22 engaging with each other between the outer circumference of the rotor coil 15 and the inner circumference of the stator 8 respectively.

Each claw magnetic pole 21, 22 is formed so as to be thick and wide on the base part 19b, 20b side while gradually decreasing in thickness and width (tapered) toward the end side.

Inner circumferential face of each claw magnetic pole 21, 22 gradually decreases in thickness toward the end thereof while outer circumferential face being arc-shaped extending along the inner circumferential face of the stator 8.

Each of claw magnetic poles 21, 22 has two trapezoidal side faces with respect to the circumferential direction of the rotor 7.

The claw magnetic poles 21 and 22 are engaged with each other with their ends opposite to each other, and therefore slants of the inner circumferential faces of the claw magnetic poles 21, 22 are alternately arranged in the circumferential direction.

Side faces of the claw magnetic poles 21, 22 gradually decrease in width from the base side to the end side and inclines toward the center of the claw magnetic poles 21, 22.

Now, operation of the rotor is hereinafter described.

A battery not shown in the drawing supplies a current to the rotor coil 15 through the brushes 10 and the slip ring 9 so as to generate a magnetic flux. Thus, the claw magnetic poles 21 of the first pole core body 19 are polarized with the N-pole, and the claw magnetic poles 22 of the second pole core body 20 are polarized with the S-pole.

On the other hand, the rotating force of engine drives the pulley 4, the shaft 6 rotates the rotor 7, and, as a result, an electromotive force is generated in the stator coil 18.

This alternating electromotive force is rectified into a direct current through the rectifier 12 and the regulator 14 regulates intensity thereof, whereby the battery is charged with the direct current.

On the other hand, it is possible to use the rotor as a motor by applying a voltage to the respective ac terminals.

Figure 2:
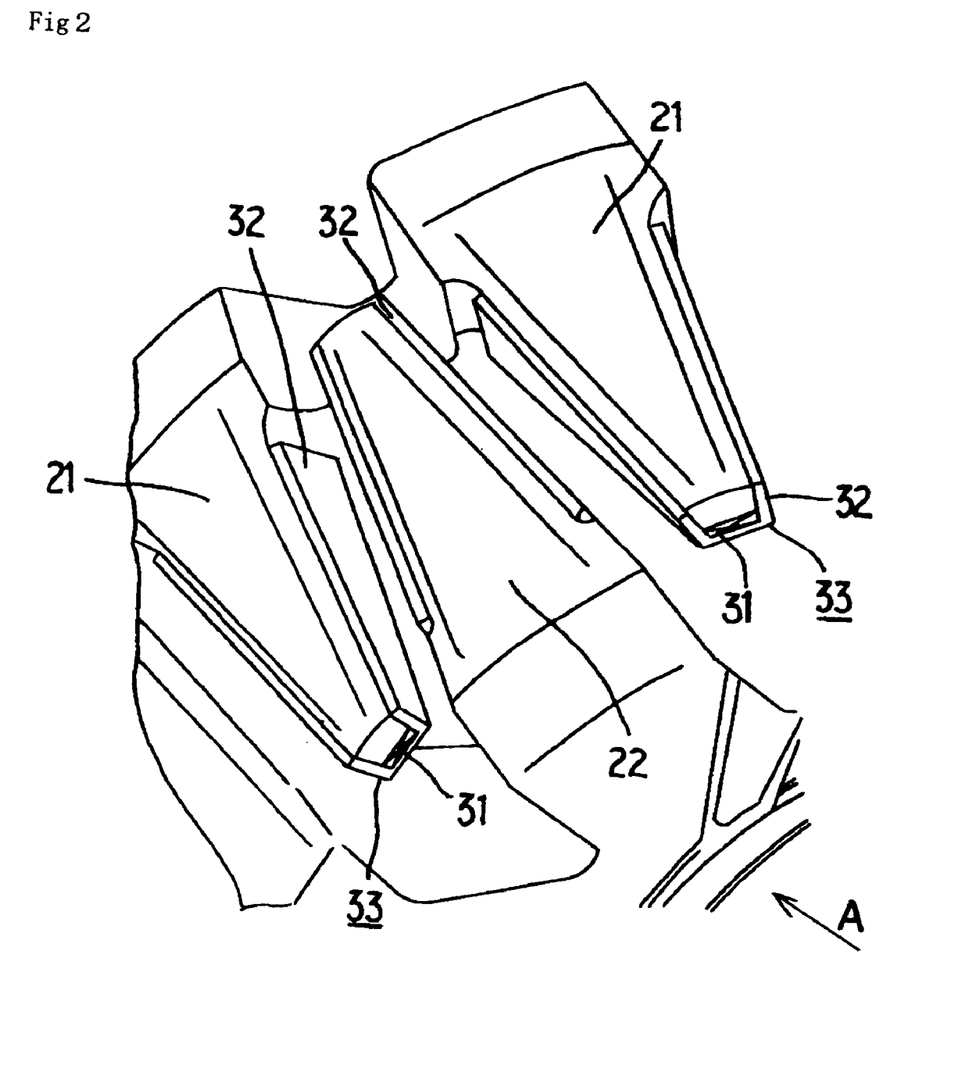
FIG. 2 is a perspective view showing a rotor portion of an electric rotating machine according to Embodiment 1 of the invention.
Figure 3:
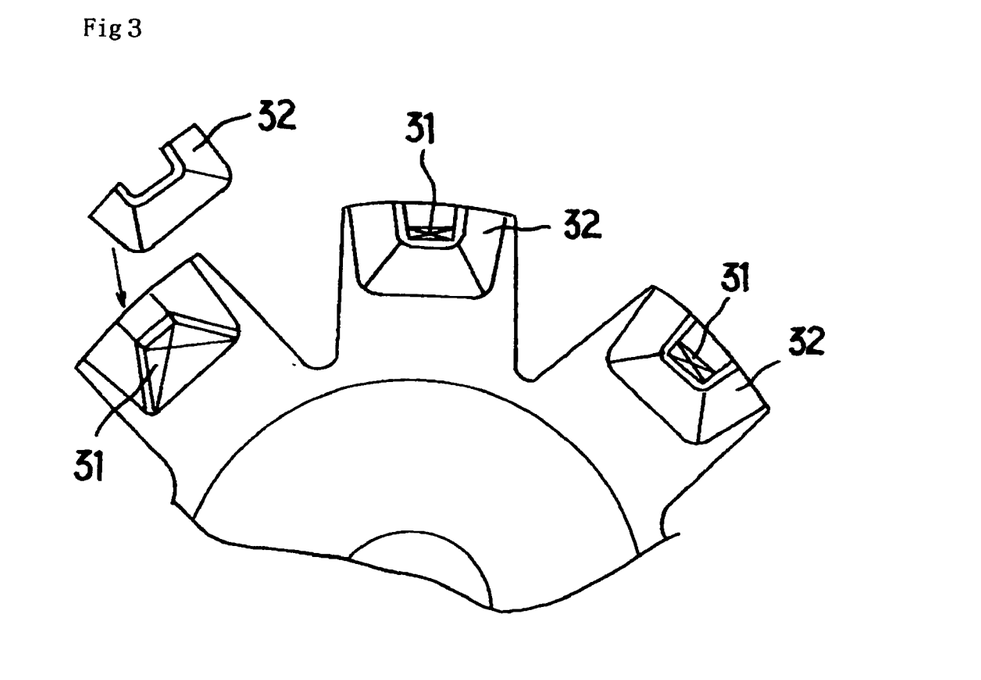
FIG. 3 is a front view of the rotor portion taken in the direction A of FIG. 1.
Figure 4:
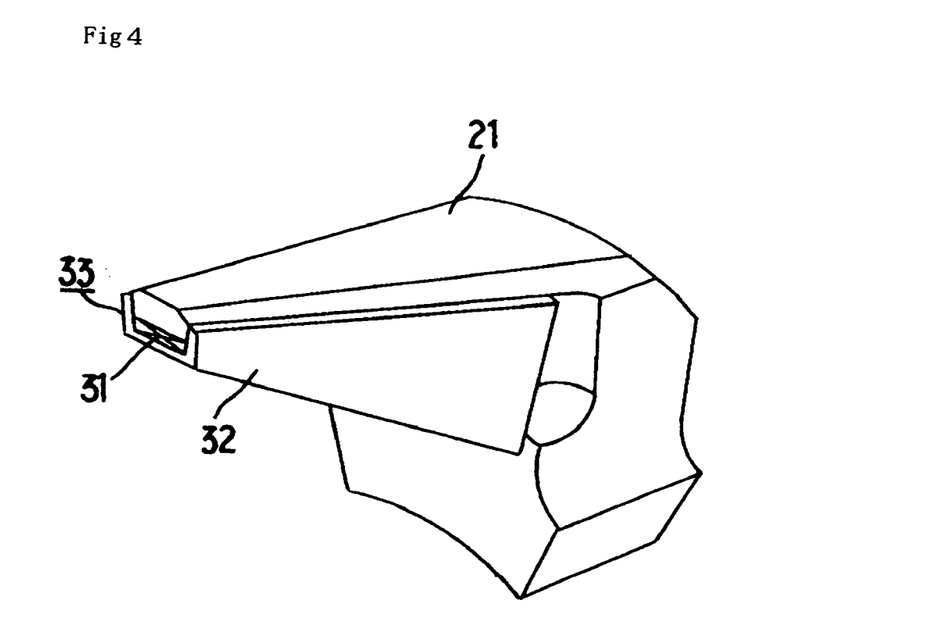
FIG. 4 is a perspective view showing a claw magnetic pole portion.
Figure 5:
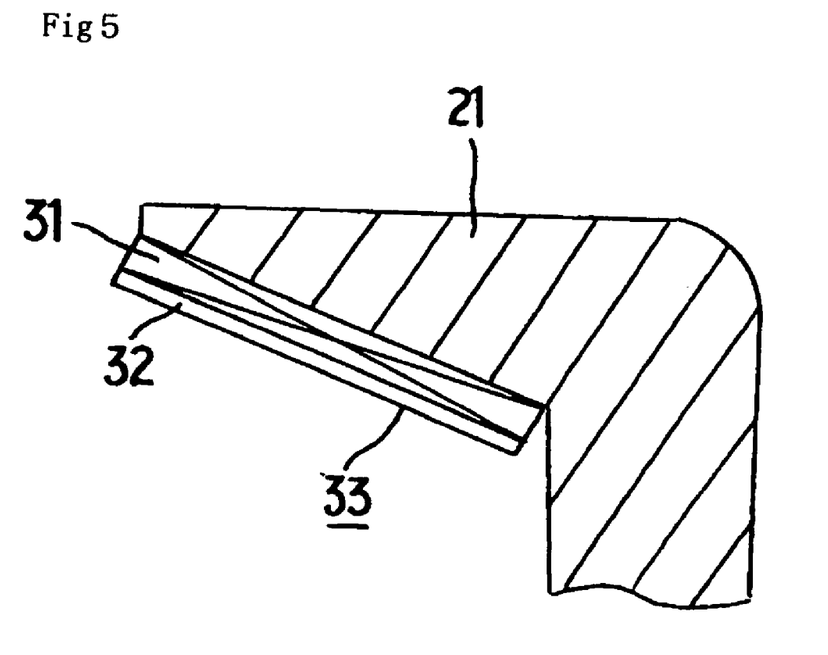
FIG. 5 is a sectional view in axial direction showing the claw magnetic pole portion.

FIG. 2 is a perspective view showing a rotor portion, FIG. 3 is a front view of the rotor portion taken in the direction A of FIG. 2. FIG. 4 is a perspective view showing one claw magnetic pole, and FIG. 5 is a sectional view in axial direction of the claw magnetic pole.

As shown in the drawings, each claw magnetic pole 21 is provided with one neodymium magnet 31, which is polarized so as to reduce leakage of magnetic flux from the inside diameter face of respective claw magnetic poles 21, 22, on the inside diameter face of the claw magnetic pole 21. Each claw magnetic pole 22 is also provided with one neodymium magnet 31 on the inside diameter face of the claw magnetic pole 22.

A magnet-holding member 32 holds this magnet 31, and the magnet 31 and the magnet-holding member 32 form a magnet assembly 33.

The magnet-holding member 32 is formed by bending a stainless steel (SUS304) plate of 0.5 mm in thickness, and is manufactured with ease.

The magnet 31, as well as the inside diameter face of the claw magnetic poles 21, 22, is trapezoidal plate-shaped, and the magnet-holding member 32 is fixed to the claw magnetic poles 21, 22 on both side thereof.

The magnet assembly 33 is fixed to the claw magnetic poles 21, 22 with an adhesive or the like.

Specifically, an adhesive or the like is applied between both side faces of the claw magnetic poles 21, 22 and internal side faces of the magnet-holding member 32.

In a case where the claw magnetic poles 21, 22 and the magnet-holding member 32 are both made of metal, it is also preferable to fix the magnet-holding member 32 to the claw magnetic poles 21, 22 by welding.

As described above, it is possible to reduce leakage of magnetic flux from inside diameter faces of the claw magnetic poles 21, 22 by fitting the magnets 31, thereby improving output.

In addition, as the centrifugal force loaded on this magnet 31 directly acts on the inside of the claw magnetic poles 21, 22, it is not necessary for the magnet-holding member 32 to receive the centrifugal force loaded on the magnet 31.

Therefore, it is not necessary that the magnet-holding member 32 is so strong as the conventional magnet-holding member, and it is possible to lighten the magnet-holding member 32 by, for example, cutting the side face parts of the magnet-holding member 32 to reduce thickness thereof.

This makes it possible to relatively reduce weight applied on the law magnetic poles 21, 22 and restrain deformation caused by centrifugal force.

As a result, it is possible to reduce the air gap between the rotor 7 and the stator 8 and improve output of the electric rotating machine.

Embodiment 2.

Figure 6:
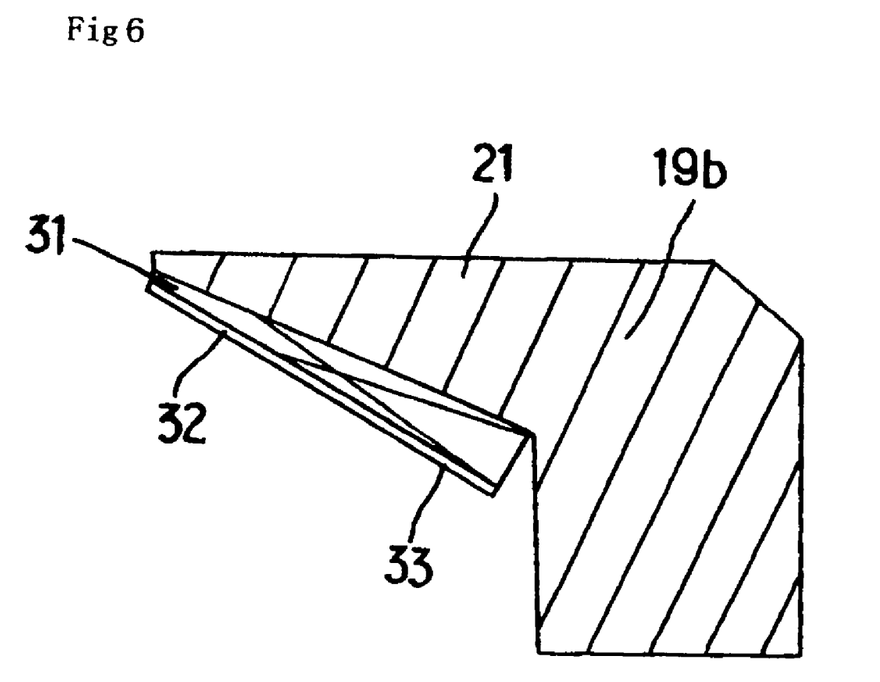
FIG. 6 is a sectional view in axial direction showing a claw magnetic pole portion according to Embodiment 2 of the invention.

FIG. 6 is a sectional view in axial direction showing a claw magnetic pole portion of an electric rotating machine according to Embodiment 2 of the invention.

This embodiment differs from Embodiment 1 in the aspect that the neodymium magnet 31 is also trapezoidal in axial direction.

More specifically, the magnet assembly 33 is arranged so that center of gravity of the magnet assembly 33 is located on the base parts 19b, 20b of high rigidity at the portion nearer than the center of the claw magnetic poles 21, 22, whereby end part of the claw magnetic poles 21, 22 moving largely is reduced in weight.

When rotating the rotor 7 under the mentioned situation, the end part of the claw magnetic poles 21, 22 moving largely, receives centrifugal force less than in the conventional art, and the base part moving less comes to receive centrifugal force more.

The claw magnetic poles 21, 22 are cantilevered and supported on the base part, and therefore the centrifugal force on the end part is reduced. Thus it becomes possible to restrain movement of the end part and reduce air gap between the rotor 7 and the stator 8.

As a result, output of the electric rotating machine is improved.

Embodiment 3.

Figure 7:
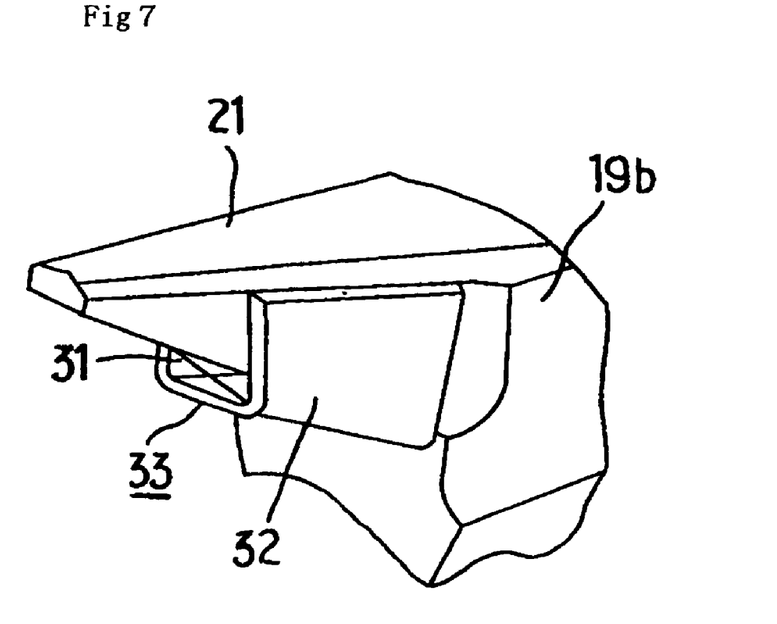
FIG. 7 is a perspective view showing a claw magnetic pole portion according to Embodiment 3 of the invention.

FIG. 7 is a perspective view showing a claw magnetic pole portion of an electric rotating machine according to Embodiment 3 of the invention.

In the foregoing Embodiment 2, the magnet assembly is constructed so as to cover the whole side of the claw magnetic poles 21,22 and, furthermore, center of gravity is located near the base side. In this Embodiment 3, however, not only center of gravity of the magnet assembly 33 but also the magnet assembly 33 itself is diminished in size and formed on the base part side of the claw magnetic poles 21, 22.

In other words, the whole magnet assembly 33 is located on the base parts 19b, 20b side.

By employing the construction described above, centrifugal force on the claw magnetic poles 21, 22 increases only on the base parts 19b, 20b side, and therefore the end of the claw magnetic poles 21, 22 receives less centrifugal force, and movement of the claw magnetic poles 21, 22 becomes small. As a result, the air gap between the rotor 7 and the stator 8 is further reduced as compared with the foregoing Embodiment 2, and therefore it is possible to increase output.

As described above, according to this embodiment, since the magnet assembly 33 is arranged so that not only center of gravity but also external part of itself is located on the base parts 19b, 20b side of the claw magnetic poles 21, 22, centrifugal force on the claw magnetic poles 21, 22 increases only on the base parts 19b, 20b side of the highest rigidity in the magnetic pole.

As a result, the end part of the claw magnetic poles 21, 22 is less influenced by centrifugal force and moves less, and it is possible to further reduce the air gap between the rotor 7 and the stator 8 and improve output as compared with the foregoing Embodiment 2.

Embodiment 4.

Figure 8:
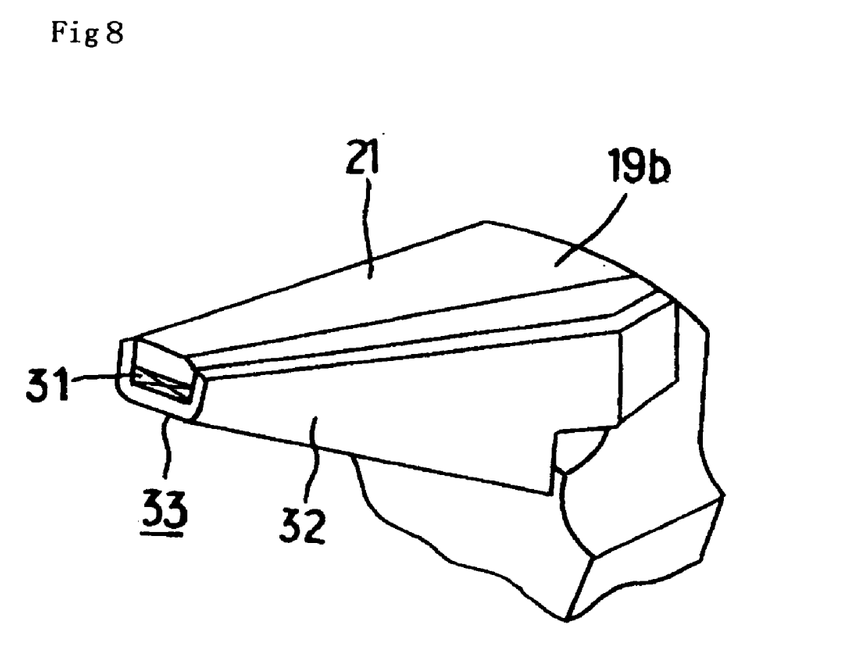
FIG. 8 is a perspective view showing a claw magnetic pole portion according to Embodiment 4 of the invention.

FIG. 8 is a perspective view showing a claw pole portion of an electric rotating machine according to Embodiment 4 of the invention.

As shown in the drawing, the magnet-holding member 32 extends to the side face of the base part 19b along both side faces of the claw magnetic pole 21.

This extending portion is adhered to the claw magnetic pole 21 with an adhesive agent or welded thereto for fixation.

As a result, the area in which the magnet-holding member 32 is fixed to the claw magnetic pole 21 is increased, and the magnet-holding member 32 is fixed more strongly than that in the foregoing embodiments. Furthermore, it is possible to restrain rotation in the circumferential direction of the rotor.

Figure 9:
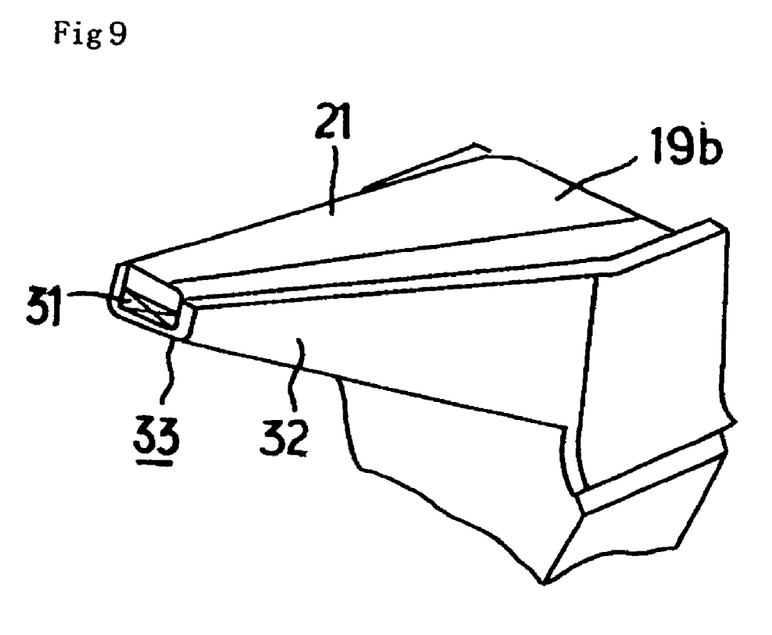
FIG. 9 is a perspective view showing a modified claw magnetic pole portion according to Embodiment 4 of the invention.

FIG. 9 is a perspective view showing a modification of the claw magnetic pole portion. In this modification, the magnet assembly 33 is fixed to the claw magnetic pole 21 by joining the claw magnetic pole 21 and the magnet assembly 33 on the area as large as possible, thereby preventing movement in axial direction.

Furthermore, any further process is not necessary for the claw magnetic pole 21 itself, and therefore it is easy to design a magnetic circuit.

Embodiment 5.

In this embodiment, the claw magnetic poles 21, 22 are provided with any fixing part to which the magnet assembly 33 is fixed in axial direction of the claw pole 21, 22. This construction makes it easy to prevent the magnet 31 from moving in axial direction and to decide the position of the magnet 31 in assembling the rotor 7, and assembling efficiency is improved.

By providing the magnet holding mechanism for preventing the magnet 31 from moving in axial direction, it is easy to prevent the magnet 31 from getting out due to vibration of the electric rotating machine.

Figure 10:
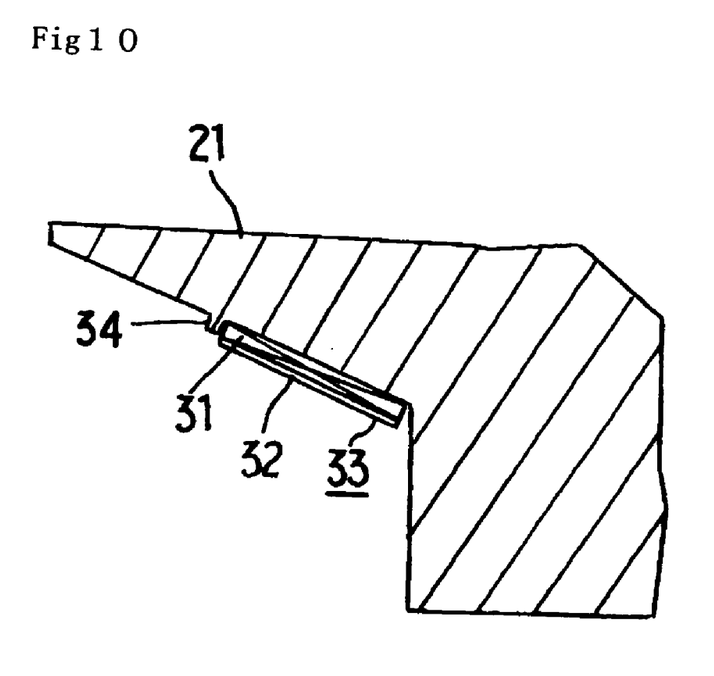
FIG. 10 is a sectional view in axial direction showing a Claw magnetic pole portion according to Embodiment 5 of the invention.

FIG. 10 is a sectional view in axial direction showing the claw magnetic pole portion of the electric rotating machine according to Embodiment 5 of the invention. In this drawing, the claw pole 21 is provided with a protrusion 34 at a part on the inside diameter side, and this fixing part prevents the magnet 31, which prevents leakage of magnetic flux, from moving in axial direction. As a result, the protrusion 34 not only prevents the magnet 31 from getting out in axial direction but also acts as a guide for positioning at the time of assembling, thus improving assembling efficiency.

Figure 11:
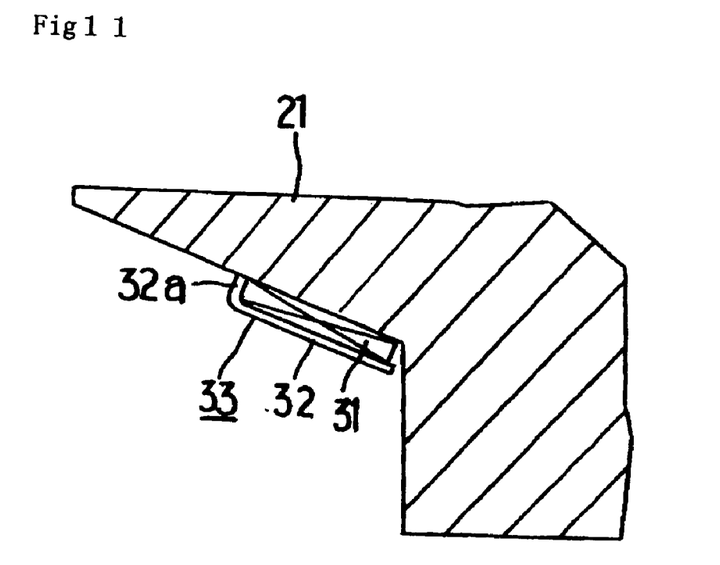
FIG. 11 is a sectional view in axial direction showing a modified claw magnetic pole portion according to Embodiment 5 of the invention.

FIG. 11 is a sectional view in axial direction showing a modification of the claw magnetic pole portion. In this drawing, a part of the magnet-holding member 32 extends, and an end of this extending portion 32a and the claw magnetic pole 21 are welded or joined together with an adhesive or the like in order to fix the magnet 31 in axial direction.

As a result, the magnet assembly 33 is more strongly fixed to the claw magnetic pole 21, and it is possible to prevent the magnet 31 from moving in axial direction.

According to the modification in FIG. 10, any further process is not necessary for the claw magnetic poles 21, 22, and it is therefore possible to apply a conventional magnetic circuit as it is at the time of designing a magnetic circuit.

Embodiment 6.

Figure 12:
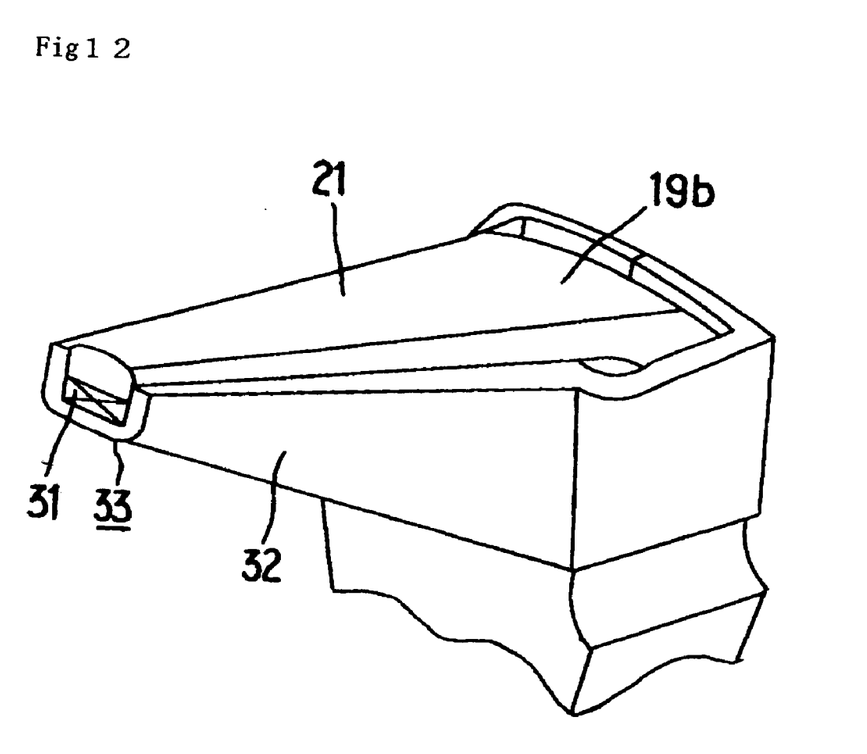
FIG. 12 is a perspective view showing a claw magnetic pole portion according to Embodiment 6 of the invention.

FIG. 12 is a perspective view showing a claw magnetic pole portion of an electric rotating machine according to Embodiment 6 of the invention. In the drawing, the magnet-holding member 32 extends further up to the base part 19b of the claw magnetic poles 21, 22, and is bent and fixed to the claw magnetic pole 21.

In this manner, the magnet-holding member 32 is constructed so as to embrace the claw magnetic pole 21 with both sides of the magnet-holding member 32 bent and joined together on backside of the pole.

As a result, the magnet-holding member 32 is strongly fixed to the claw magnetic pole 21 with a fixing face located in axial direction, and it is therefore possible to prevent the magnet assembly 33 from moving in axial direction.

Furthermore, since the portion where the magnet assembly 33 is fixed to the claw magnetic poles 21, 22 is located on the fixing face in axial direction, it is possible to utilize elastic deformation of the magnet-holding member 32 at the time of fixing the magnet assembly 33 to the pole cores 19, 20 in assembling and, consequently, assembling efficiency is improved.

Thus, according to this embodiment, the magnet-holding member 32 extends to the pole back face part and fitted to the claw magnetic poles 21, 22, and both ends of the magnet-holding member 32 are joined together on the backside of the pole.

By employing the construction described above, movement of the magnet 31 in axial direction is supported on the base parts 19b, 20b of the claw magnetic poles 21, 22, and therefore the magnet-holding member 32 is strongly fixed to the claw magnetic poles 21, 22 on the end face, and this facilitates the joining process for fixing the magnet-holding member 32 to the claw poles 21, 22.

Embodiment 7.

Figure 13:
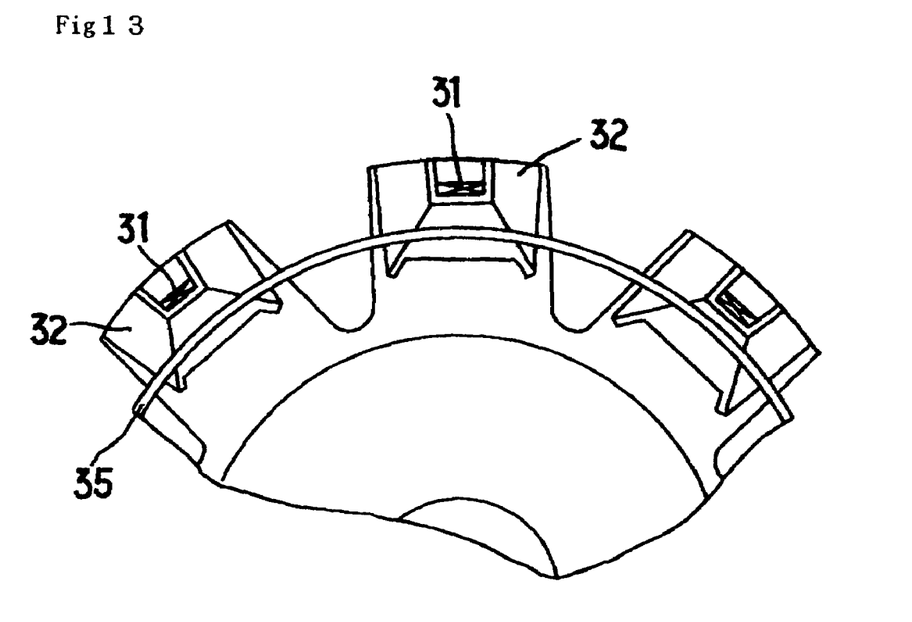
FIG. 13 is a front view showing a rotor portion according to Embodiment 7 of the invention.
Figure 14:
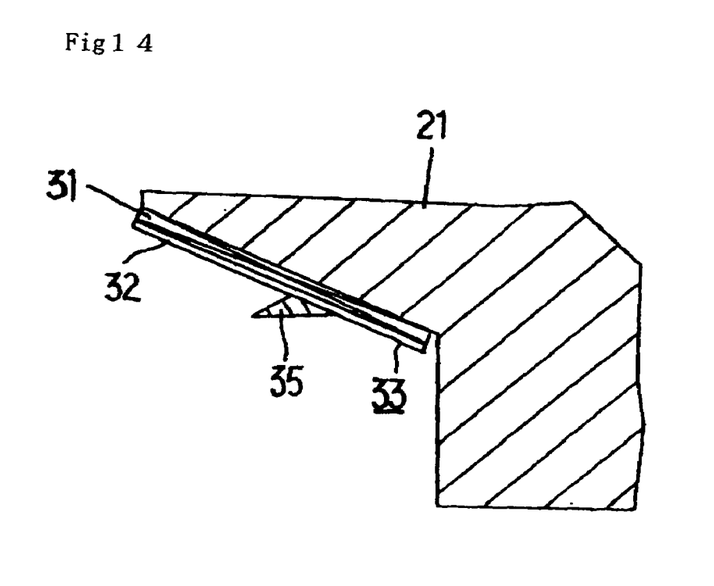
FIG. 14 is a sectional view in axial direction showing a claw magnetic pole portion according to Embodiment 7 of the invention.

FIG. 13 is a front view showing a rotor portion according to Embodiment 7 of the invention, and FIG. 14 is a sectional view in axial direction showing a claw magnetic pole portion. In the drawings, cylindrical ring 35 is fixed on the inside diameter side of the claw magnetic poles 21, 22. Further, the magnet assembly 33 is press-fitted by the cylindrical ring 35 and, this cylindrical ring 35 supports the claw magnetic poles 21, 22.

As a result, it is possible to press the magnet assembly 33 onto the claw magnetic poles 21, 22 and strongly fix the magnet assembly 33.

In addition, the ring 35 is not always required to be cylindrical but any other configuration is preferable as far as extending along the outer periphery of the claw poles magnetic 21, 22.

Although the foregoing Embodiments 1 to 7 show a rotor structure of a type in which a field coil is incorporated in the rotor and rotates along with the claw magnetic poles and a field current is supplied to the field coil through a brush, the above-described construction is also applicable to a brushless-type generator in which a field coil is fixed onto a bracket and a rotating field is supplied from the air gap.

What is claimed is:

1. A rotor of an electric rotating machine comprising: a rotor coil for generating magnetic flux by applying a current; and a pole core comprised of a first pole core body and a second pole core body that are arranged so as to cover said rotor coil, each being provided with claw-shaped claw magnetic poles engaging with each other;

wherein a magnet assembly composed of a magnet for reducing leakage of magnetic flux and a magnet-holding member for supporting said magnet on said claw magnetic poles are arranged on inside diameter faces of said claw magnetic poles, and said magnet assembly is formed so that center of gravity of said magnet assembly is located on the base part side nearer than the center of said claw magnetic pole.

2. The rotor of an electric rotating machine according to claim 1, wherein said magnet-holding member extends to the base part of said claw magnetic pole and is fitted to said claw magnetic pole.

3. The rotor of an electric rotating machine according to claim 1, wherein a fixing part for preventing said magnet from moving in axial direction is arranged on the inside diameter side of said claw magnetic pole.

4. The rotor of an electric rotating machine according to claim 1, wherein an end of said magnet-holding member and said claw magnetic pole are joined together to prevent said magnet from moving in axial direction.

5. The rotor of an electric rotating machine according to claim 1, wherein said magnet-holding member extends to backside of the pole and is fitted to said claw magnetic pole, and two magnet-holding members are joined together on said backside of the pole.

6. The rotor of an electric rotating machine according to claim 1, wherein a ring for press fitting said magnet assembly is provided on the inside diameter side of said claw magnetic poles.

* * * * *